US006992561B2

(12) United States Patent
Sandt et al.

(10) Patent No.: US 6,992,561 B2
(45) Date of Patent: Jan. 31, 2006

(54) SYSTEM FOR THE CONTROL AND MONITORING OF SANITARY APPLIANCES

(75) Inventors: Burkhard Sandt, Berlin (DE); Christian Roschinsky, Kehrigk (DE); Joachim Rennau, Berlin (DE)

(73) Assignee: Aqua Rotter GmbH, Ludwigsfelde (DE)

( * ) Notice: Subject to any disclaimer, the term of this patent is extended or adjusted under 35 U.S.C. 154(b) by 337 days.

(21) Appl. No.: 10/362,716

(22) PCT Filed: Aug. 17, 2001

(86) PCT No.: PCT/EP01/09540

§ 371 (c)(1),
(2), (4) Date: Feb. 24, 2003

(87) PCT Pub. No.: WO02/14614

PCT Pub. Date: Feb. 21, 2002

(65) Prior Publication Data

US 2004/0011716 A1 Jan. 22, 2004

(30) Foreign Application Priority Data

Aug. 17, 2000 (DE) ................................ 100 42 165

(51) Int. Cl.
*B01D 21/30* (2006.01)
(52) U.S. Cl. .................. 340/3.1; 340/3.51; 210/43
(58) Field of Classification Search .............. 340/3.1, 340/3.51, 825.52, 506, 573.1, 825.69; 370/225; 210/143; 251/129.04; 4/623; 702/128; 307/66
See application file for complete search history.

(56) References Cited

U.S. PATENT DOCUMENTS

| | | | |
|---|---|---|---|
| 5,477,091 A * | 12/1995 | Fiorina et al. ................. 307/66 |
| 5,537,104 A * | 7/1996 | Van Dort et al. ....... 340/825.52 |
| 5,565,855 A * | 10/1996 | Knibbe ....................... 340/3.51 |
| 5,682,476 A * | 10/1997 | Tapperson et al. ........... 370/225 |
| 5,743,511 A | 4/1998 | Eichholz et al. |
| 6,222,448 B1 * | 4/2001 | Beck et al. .................. 340/506 |
| 6,236,317 B1 * | 5/2001 | Cohen et al. ............. 340/573.1 |
| 6,250,601 B1 * | 6/2001 | Kolar et al. ............ 251/129.04 |
| 6,360,181 B1 * | 3/2002 | Gemmell et al. ........... 702/128 |

FOREIGN PATENT DOCUMENTS

| | | |
|---|---|---|
| DE | G 93 13 983.7 | 11/1993 |
| DE | 195 02 214 A1 | 8/1996 |
| DE | 296 03 660 U1 | 7/1997 |
| DE | 196 16 207 A1 | 11/1997 |
| EP | 0 940 738 A2 | 9/1999 |

* cited by examiner

Primary Examiner—Edwin C. Holloway, III
(74) Attorney, Agent, or Firm—Brinks Hofer Gilson Lione

(57) ABSTRACT

A system for the control and monitoring of electronic sanitary appliances with a command level, an automation level and a field level. The automation level includes automation stations (1) which are each connected by a field bus (2) with several sanitary appliances (A, B, C, D, E). At least one radio station (4) is provided which communicates via a connected line with the appropriate automation station (1). The radio station (4) is in connection with at least one part (C, D) of the several sanitary appliances by means of a wireless data transmission path.

12 Claims, 1 Drawing Sheet

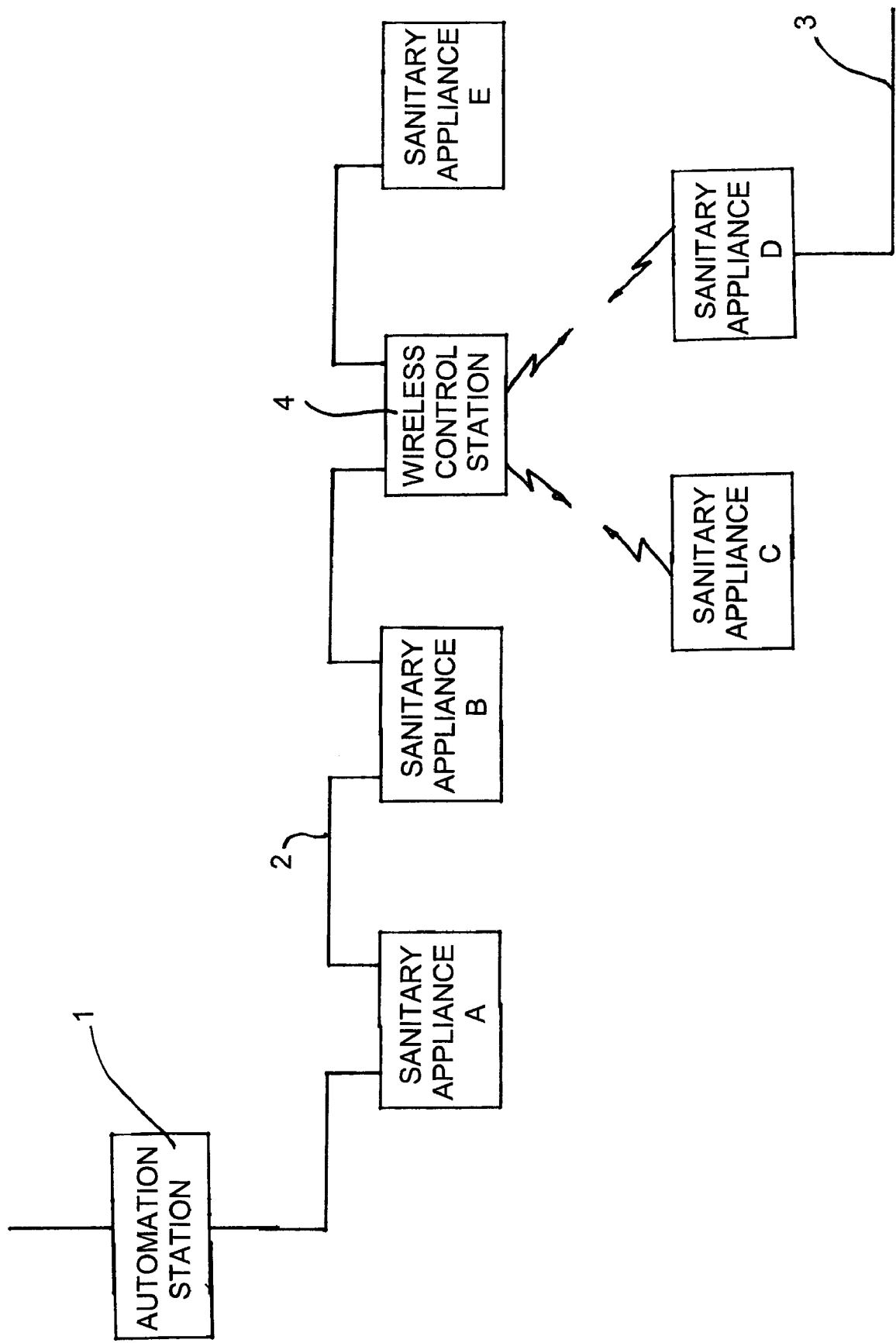

SYSTEM FOR THE CONTROL AND MONITORING OF SANITARY APPLIANCES

BACKGROUND OF THE INVENTION

This invention relates to a system for the control and monitoring of the electronic sanitary appliances with a command level, an automation level and a field level, and particularly to such systems in which the automation stations provided in the automation level are each connected to several sanitary appliances through a field bus.

The applicant has developed a system for the control of sanitary installations in buildings which is known under the designation of AQUA 3000. This system is subdivided in a hierarchical manner into a management level or command level, an automation level and a field level.

On the field level, all the water course operations required for the user are taking place by means of the appropriate sanitary appliances. The electronic sanitary appliances ready for bus are integrated into the data communication network for the control and monitoring through a four conductor cable, and are supplied moreover with the voltage required for their operation.

On the automation level, detecting, monitoring, regulating, controlling and optimizing of all sanitary engineering water course operations is achieved in so-called automation stations, which are each connected to several sanitary appliances through a field bus. Here, the peak load optimizations, automatic sequence controls as well as the maintenance management and safety measures are the most important areas of responsibility.

On the topmost level, the management level or command level is achieved operating, monitoring, analyzing and logging of all sanitary engineering processes.

As previously mentioned, this known system requires a four conductor line connection to each sanitary appliance, wherein two conductors are needed for the voltage supply and two conductors are needed for the data communications to transmit instructions, condition statements and the like. Here, a problem results, however, in particular with retrofitting of available sanitary installations, the sanitary appliances usually have not been electrically operated heretofore, and hence did not include an electrical line terminal. If such an appliance has been substituted by an electrically operated appliance, the problem of electric power supply was solved in that the new appliance was provided with a battery. Thus, there is still not the possibility, however, to integrate the appliance into a general system for the control and monitoring of appliances. Also with sanitary installations to be newly installed, it may sometimes be useful to do without a line-bound electric terminal and to use battery-operated appliances.

Therefore, it is the object of the present invention to develop a system for the control and monitoring of electronic sanitary appliances with a command level, an automation level and a field level, in which automation stations provided in the automation level are each connected to a plurality of sanitary appliances through a field bus, wherein the system allows one to integrate sanitary appliances provided without any electrical line terminal into the system as well.

SUMMARY OF THE INVENTION

This object is solved according to the invention by providing at least wireless control station communicating with the associated automation station in a line-bound way through the field bus, which is in communication with at least a part of the several sanitary appliances through a wireless data bus associated with each of the several sanitary appliances. Advantageous improvements of the system according to the invention result from the features of the invention discussed below.

As a result of providing at least one wireless control station communicating with the associated automation station in a line-bound manner through the field bus, which is in communication with at least a part of the plurality of sanitary appliances through one wireless data bus each, on the one hand, it is possible to use sanitary appliances in which voltage supply is ensured by a battery mounted to the appliance and, on the other hand, data communication with the associated automation station subsequently is taking place partially through the field bus and partially by means of wireless communication. However, the invention is also applicable to such appliances, to which an electrical distribution voltage is fed through a two conductor line, which means that additional leads are not available for data communication.

The data communication through the wireless data bus is preferably bidirectional, i.e. instructions are allowed to be transmitted from the wireless control station to the sanitary appliance for the control thereof, and state informations are allowed to be transmitted from the sanitary appliance to the wireless control station.

The wireless control station should not only represent an interface for the transformation of signals transmitted in a line-bound manner into radio signals and vice versa, but should also communicate with the sanitary appliances connected to it in a wireless manner such that the power consumption of the battery-operated appliances is low if possible.

The sanitary appliances connected to a wireless control station in a wireless manner are appropriately located in one up to three sanitary rooms at maximum adjacent to each other, which should have a distance up to about 20 metres from the wireless control station. The transmitters in the wireless control stations and in the sanitary appliances should have an adjustable range allowing these to be adapted according to the respective local conditions.

In the following, the invention will be explained in more detail according to an embodiment shown in the FIGURE. This shows a diagrammatic block chart of an automation station in the automation level as well as the sanitary appliances connected to this in the field level.

The automation station 1 is part of the automation level of a water management system. The automation level usually comprising a plurality of automation stations 1 separated from each other is connected to a higher ranked management level or command level not shown, which takes on controlling and monitoring tasks of higher order that cannot be satisfactorily achieved by the individual automation stations 1.

The automation station 1 serves substantially for detecting, monitoring, regulating, controlling and optimizing the operating states of the subordinate sanitary appliances in the field level. With this, the individual sanitary appliances are connected in series to a four conductor field bus 2 which leads to the automation station 1. The field bus 2 serves for the transmission of the supply voltage as well as for the data communication.

In the shown embodiment five sanitary appliances indicated with A, B, C, D and E are connected to the automation station 1. However, a considerably greater number of sanitary appliances can be connected to the automation station 1 in fact.

BRIEF DESCRIPTION OF THE DRAWING

As the FIGURE shows, the sanitary appliances A, B and E are directly connected to the field bus 2, so that they are immediately supplied with its operating voltage through the field bus 2, and they also use exceptionally the field bus 2 for the bidirectional data exchange with the automation station 1.

DESCRIPTION OF A PREFERRED EMBODIMENT

The sanitary appliances C and D are not directly connected to the field bus 2 because for economical or technical reasons, for example, it would be unsuitable to provide such a connection. The voltage supply of the sanitary appliance C is achieved by a battery whereas the appliance D is connected to a power supply network through a two conductor line 3.

In order to allow performing data communication between the automation station 1 and the sanitary appliances C and D, a wireless control station 4 is directly connected to the field bus 2 in the same way as the appliances A, B and E. The wireless control station 4 receives the control commands addressed to the appliances C and D from the automation station 1 through the field bus 2 and converts them into signals which can be transferred by wireless communication. The signals transmitted from the antenna of the wireless control station 4 are received by the antennas of the appliances C and D, and the appliance which the control command is addressed to is implementing this.

Conversely, the state informations of one of the appliances C or D will be prepared by the electronics thereof into signals, which can be transferred by wireless communication and transmitted to the wireless control station 4 in a wireless way. In that they will be converted into signals which can be transferred to the automation station 1 through the field bus 2.

The communication between the wireless control station 4 and the connected appliances at least the battery-operated ones should take place in such a way, that the power consumption of the appliances is low if possible. Thus, for example, it is possible that the appliances will not be continuously maintained in an operating state in which they are ready to receive instructions from the automation station, but they are allowed to implement an inquiry during particular time intervals at the wireless control station whether such an instruction is present. If this is the case, then the appliance will be switched into the ready-to-receive state such that the instruction can be transmitted to it. The wireless control station thus must be capable of storing instructions until their communication to the appliance.

The fault messages, number of actuations of an appliance, amount of battery voltage inside the appliance C and the like, for example, are allowed to be transmitted as state informations. Measures for trouble-shooting a fault, switching off the appliance during a fault being not recoverable, special uses such as cleaning or desinfecting measures, e.g. flushing actions or thermal desinfection, setting of operating parameters and the like are allowed to be transmitted as instructions. For example, the reported number of actuations is allowed to be used to determine the cleaning and maintenance rates. The reported level of the operating voltage serves for the determination whether a battery is dead and has to be exchanged.

The system can be formed such that all sanitary appliances communicate in a wireless manner with the field bus. Since the wireless control stations are merely designed for a particular number of appliances, 16 for example, several wireless control stations are allowed to be connected in series to the field bus, if this number is exceeded. Moreover, if the appliances are spatially located too far apart from each other, a plurality of wireless control stations can be used, although the maximum possible number of appliances each is not connected.

With the installation of such a system the sanitary appliances which are provided then with a relevant selection device are allowed, depending on the quality of the data bus between the sanitary appliance and the respective wireless control station, to select that wireless control station by means of which its data communication is to be achieved. This selection can be achieved, for example, by comparing the values of the electric field strength of the signals received from the sanitary appliance and transmitted from the individual wireless control stations.

For economical or technical reasons it can be appropriate not to implement the data communication through the field bus between all the wireless control stations or a part thereof, but likewise by means of radio transmission. In this case the electric power supply of the wireless control stations concerned should be achieved by batteries.

The system is also useful for a payable use of the sanitary appliances. The payment action is achieved in a control centre, and the centre transmits instructions by radio transmission to the individual sanitary appliances by means of which these are restrictedly released according to the amount being paid for use in accordance with the requirements. Examples of such a use are showering, washing or filling up with drinking water.

In combination with the present invention, the term "sanitary appliance" does not only relate to water conducting appliances, but generally to all controllable devices which are used in sanitary rooms, e.g., electric soap dispensers, electric warm air hand driers, electric towel dispensers and the like.

What is claimed is:

1. A system for the control and monitoring of electronic sanitary appliances comprising a command level, an automation level and a field level, an automation station provided in the automation level connected in series to several sanitary appliances through a field bus, at least one wireless control station connected to the field bus in series with some of the several sanitary appliances, each wireless control station communicating with the associated automation station in a line-bound way through the field bus, each wireless control station being in communication with at least a part of the several sanitary appliances through at least one wireless data bus.

2. A system according to claim 1, wherein the data communication through said wireless data bus is bidirectional.

3. A system according to claim 1 or claim 2, wherein one wireless control station is connected in a wireless manner to said part of the several sanitary appliances provided within up to three adjacent sanitary rooms at maximum.

4. A system according to claim 1 wherein said sanitary appliances connected in a wireless manner to said wireless control stations are battery-operated.

5. A system according to claim 4, wherein the voltage values of batteries supplying said sanitary appliances are measured and informed to said associated wireless control station through said wireless data bus.

6. A system according to claim 4 wherein the communication between said wireless control stations and said battery-operated sanitary appliances is achieved with lower power consumption than the communication with those sanitary appliances connected in a line-bound way through the field bus.

7. A system according to claim 6, wherein said battery-operated sanitary appliances are only switchable into the receiving state after a message is available which is transmitted from said automation station to said associated wireless control station and addressed to said battery-operated sanitary appliances.

8. A system according to claim 1, comprising a plurality of said wireless control stations, and at least one of said sanitary appliances comprises a selector for the automatic selection of that wireless control station for the wireless data communication, the data bus of which has the best transfer characteristics to said sanitary appliance.

9. A system according to claim 8, wherein the selection of said wireless control station is achieved by means of a comparison of the electric field strengths received from the individual wireless control stations.

10. A system according to claim 9 wherein with the use of a plurality of wireless control stations, data communication between at least one part of the sanitary appliances is provided by means of radio transmission.

11. A system according to claim 1 wherein the data transmitted to said sanitary appliances include instructions on a limited release of said sanitary appliances for their use in compliance with the instructions.

12. A system according to claim 1 wherein the data transmitted to said sanitary appliances include instructions on a limited release of said sanitary appliances for a special use.

* * * * *